United States Patent
Tan et al.

(10) Patent No.: US 7,710,053 B2
(45) Date of Patent: May 4, 2010

(54) MOTOR DRIVING SYSTEM AND MOTOR DRIVING METHOD

(75) Inventors: Daisuke Tan, Hitachinaka (JP); Hirohisa Satomi, Hitachi (JP); Shigetoshi Okamatsu, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 176 days.

(21) Appl. No.: 12/108,538

(22) Filed: Apr. 24, 2008

(65) Prior Publication Data

US 2008/0265832 A1    Oct. 30, 2008

(30) Foreign Application Priority Data

Apr. 24, 2007    (JP)    ............................. 2007-114587

(51) Int. Cl.
*H02P 23/00* (2006.01)

(52) U.S. Cl. ...................... 318/277; 318/798; 318/802; 318/445; 361/23

(58) Field of Classification Search .................. 318/727, 318/798, 802, 445, 268; 361/23
See application file for complete search history.

(56) References Cited

U.S. PATENT DOCUMENTS

| | | | | |
|---|---|---|---|---|
| 5,146,147 A | * | 9/1992 | Wills et al. | 318/797 |
| 5,237,494 A | * | 8/1993 | Baader et al. | 363/141 |
| 5,414,339 A | * | 5/1995 | Masaki et al. | 318/800 |
| 6,158,553 A | * | 12/2000 | Oshima et al. | 187/293 |
| 6,229,722 B1 | * | 5/2001 | Ichikawa et al. | 363/71 |
| 6,304,006 B1 | * | 10/2001 | Jungreis | 307/64 |

* cited by examiner

*Primary Examiner*—Rita Leykin
(74) *Attorney, Agent, or Firm*—Antonelli, Terry, Stout & Kraus, LLP.

(57) ABSTRACT

A motor driving apparatus including inverter apparatuses, inverter control circuits, and a plurality of inverter control apparatuses for performing variable-speed driving of a single motor, breakers each of which being provided between each inverter apparatus and the motor, the inverter control circuits being connected in parallel to each other. Here, a motor rotation frequency/phase detection circuit of each inverter control circuit is set up on a closer side to the motor than the breakers, then frequency and phase of a terminal voltage at the motor are detected and inputted into failure-time input frequency/phase setting circuits regardless of close/open of each breaker. This feature allows computation by the failure-time input frequency/phase setting circuits to be carried out at all times, thereby making it possible to shorten a computation time needed for computing inverter-apparatus start frequency/phase.

4 Claims, 4 Drawing Sheets

CONFIGURATION EXAMPLE

CONFIGURATION EXAMPLE

EXAMPLE OF ROTATION-SPEED CHANGE IN INDUCTION MOTOR
IN ACCOMPANIMENT WITH OPERATION SWITCHING

CONFIGURATION EXAMPLE

FIG.4 CONFIGURATION EXAMPLE OF FAILURE-TIME INPUT FREQUENCY/PHASE SETTING CIRCUIT

EXAMPLE OF ROTATION - SPEED CHANGE IN INDUCTION MOTOR
IN ACCOMPANIMENT WITH OPERATION SWITCHING

EXAMPLE OF ROTATION - SPEED CHANGE IN INDUCTION MOTOR
IN ACCOMPANIMENT WITH INSTANTANEOUS
POWER - FAILURE OF POWER - SUPPLY

MOTOR DRIVING SYSTEM AND MOTOR DRIVING METHOD

BACKGROUND OF THE INVENTION

The present invention relates to a motor driving apparatus for performing variable-speed driving of a motor by using an inverter.

An induction-motor driving apparatus for performing variable-speed driving by using an inverter control apparatus is used for energy-saving operation of appliances such as fan and pump and the variable-speed driving of machines. A method which is commonly used as the countermeasure at the time of a failure of the inverter control apparatus is a method of providing a bypass circuit to a commercial-use power-supply. During the operation of the commercial-use power-supply, however, the induction motor is cut off from the inverter, then being re-injected into the commercial-use power-supply. As a result, there has existed a drawback that it is impossible to perform the variable-speed driving of the induction motor. Also, as the countermeasure, there exists a method of providing a standby-purpose inverter control apparatus in addition to the operation-purpose inverter control apparatus. At the time of the failure of the inverter control apparatus, however, the induction motor needs to be re-operated by the standby-purpose inverter control apparatus on standby after the induction motor has halted. As a result, there has existed a drawback that the system halts at one time temporarily. On account of this, in some of large-capacity inverters, a method is employed in which the control system is duplexed, and when the control system fails, the failed control system is instantaneously switched to the sound control system. This method is employed in order to shorten the switching time at the time of the failure occurrence. Nevertheless, this method has found it impossible to address a case where a main circuit system of the inverters fails. In addition thereto, in some of systems where a plurality of inverter control apparatuses are provided, the following method is employed: With respect to the plurality of inverter control apparatuses, a single standby-oriented-system inverter control apparatus is provided in its operation state. As a result of this provision, when the inverter control apparatus in operation fails, the inverter control apparatus can be switched to the standby-oriented-system inverter control apparatus on standby without halting the system.

In this way, when a failure of the inverter or an instantaneous power-failure of the power-supply occurs during operation of the induction motor, and when re-start of the operation is to be carried out, if excitation remains in the induction motor, it is necessary to synchronize phases of voltages between the inverter and the induction motor. On account of this necessity, the following control method is carried out at the time of reactivating the inverter: The control over the induction motor is restarted after rotation speed of the induction motor and speed command value of the inverter are caused to coincide with each other.

SUMMARY OF THE INVENTION conventionally, at the time of switching operation of the inverter apparatus in accompaniment with a failure of the inverter apparatus, connection change of the inverter apparatus has been made by switching a breaker provided between the inverter apparatus and the induction motor. Then, computational processing by a failure-time input frequency/phase setting circuit has been performed after detection of rotation frequency/phase of the induction motor is started. This situation has necessitated a computational time which will elapse until the rotation frequency/phase of the induction motor and rotation frequency/phase based on a phase-angle command of the inverter have coincided with each other. Accordingly, a lapse of a time is required until an inverter apparatus after being switched has been activated. As a result, there has existed a problem that the rotation speed of the induction motor is lowered in the meantime, and thus an output therefrom is also lowered.

In view of the point as described above, the present invention has been devised. Accordingly, an object of the present invention is to provide an induction-motor driving apparatus which, at the time of switching an inverter apparatus, allows the inverter apparatus to be switched to a sound inverter apparatus swiftly, and allows a lowering in the rotation speed of the induction motor at the switching time to be suppressed down to the smallest possible degree. This induction-motor driving apparatus is applied to a system where the induction motor must not halt at the time of switching the inverter apparatus and further, to a system where the above-described switching time must be shortened since an output variation at the time of switching the inverter apparatus needs to be prevented as much as possible.

Also, another object of the present invention is to provide a motor driving apparatus and motor driving method which makes it possible to shorten a time needed for restarting the inverter apparatus in a case where there occurs an instantaneous power-failure or voltage lowering of the power-supply.

In the present invention, there is provided a motor driving apparatus including inverter apparatuses each of which including a rectifier and an inverter, inverter control units for controlling the inverter apparatuses, a unit formed by connecting a plurality of inverter control apparatuses in parallel to each other, the plurality of inverter control apparatuses performing variable-speed driving of a motor, and breakers each of which being provided between each of the inverter apparatuses and the motor, each of the inverter control units, further including a failure detection unit for detecting a failure of each of the inverter apparatuses, an inverter start frequency/phase setting unit for setting frequency/phase at an inverter-apparatus starting time, a motor rotation frequency/phase detection unit for detecting frequency and phase of a terminal voltage at the motor, a failure-time input frequency/phase setting unit for performing a computation based on the values detected by the motor rotation frequency/phase detection unit, and outputting the computed output to the inverter start frequency/phase setting unit, and a failure-occurrence-signal reception unit for receiving a failure occurrence signal outputted from a failure detection unit of the other inverter control apparatus, inputting the output of the failure-time input frequency/phase setting unit into the inverter start frequency/phase setting unit, and instructing the inverter start frequency/phase setting unit to start the inverter, wherein, at a failure occurrence time of each of the inverter apparatuses for driving the motor, each of the breakers is switched to the other inverter control apparatus based on a failure occurrence signal outputted from the failure detection unit of the inverter control apparatus, and the inverter is started by controlling the frequency and the phase at the inverter-apparatus starting time by using the failure-time input frequency/phase setting unit of the inverter control apparatus which is to be newly started by the switching.

Moreover, the motor rotation frequency/phase detection unit of each inverter control unit is set up on a closer side to the motor than the breakers each of which being provided between each of the inverter apparatuses and the motor, the frequency and the phase of the terminal voltage at the motor detected by the motor rotation frequency/phase detection unit being inputted into the failure-time input frequency/phase setting unit regardless of close/open of each of the breakers, and the computation by the failure-time input frequency/phase setting unit being carried out at all times.

According to the present invention, the frequency and the phase of the terminal voltage at the motor can be detected at all times by setting up the motor rotation frequency/phase detection unit of each inverter control unit on the closer side to the motor than the breaker. As a result, it becomes possible to input the frequency and the phase into the failure-time input frequency/phase setting unit at all times, and thereby to carry out the computation at all times. On account of this, even if each inverter control apparatus is on standby, and even if the breaker between the inverter apparatus and the motor is opened, it becomes possible to carry out the computation by the failure-time input frequency/phase setting unit. This feature, in switching an inverter control apparatus at a failure time, makes it possible to shorten a computation time needed for computing the start frequency/phase of an inverter control apparatus which is to be newly started. Also, it becomes possible to shorten a time needed for the switching as well. Accordingly, an output variation in the motor in accompaniment with the switching of the inverter control apparatus can be suppressed down to the smallest possible degree.

Also, the operation of the inverter apparatus can be switched to another normal inverter apparatus swiftly without halting the motor. In addition, the output variation in the motor at the time of switching the inverter apparatus can be suppressed down to the smallest possible degree. This feature allows an enhancement in reliability of the entire system to which the motor is applied.

Also, according to the present invention, there is no necessity for installing a directly-functioning speed detector on axis of the motor. Moreover, modification to be made from the conventional configurations is small in amount. This feature makes the present invention easily applicable.

Other objects, features and advantages of the invention will become apparent from the following description of the embodiments of the invention taken in conjunction with the accompanying drawings.

DESCRIPTION OF THE EMBODIMENTS

First, referring to an induction-motor driving apparatus of a comparison reference example intended for making the present invention easy to understand, the explanation will be given below concerning a case where one unit of standby-oriented-system inverter control apparatus is provided and an inverter is made redundant. A detection circuit for measuring rotation frequency/phase of an induction motor is provided in inverter control apparatuses. Then, at the time of starting the redundant inverter, a control method is employed which drives the induction motor after the rotation frequency/phase of the induction motor and frequency/phase of a phase-angle command value of the inverter are caused to coincide with each other.

Figure 3:
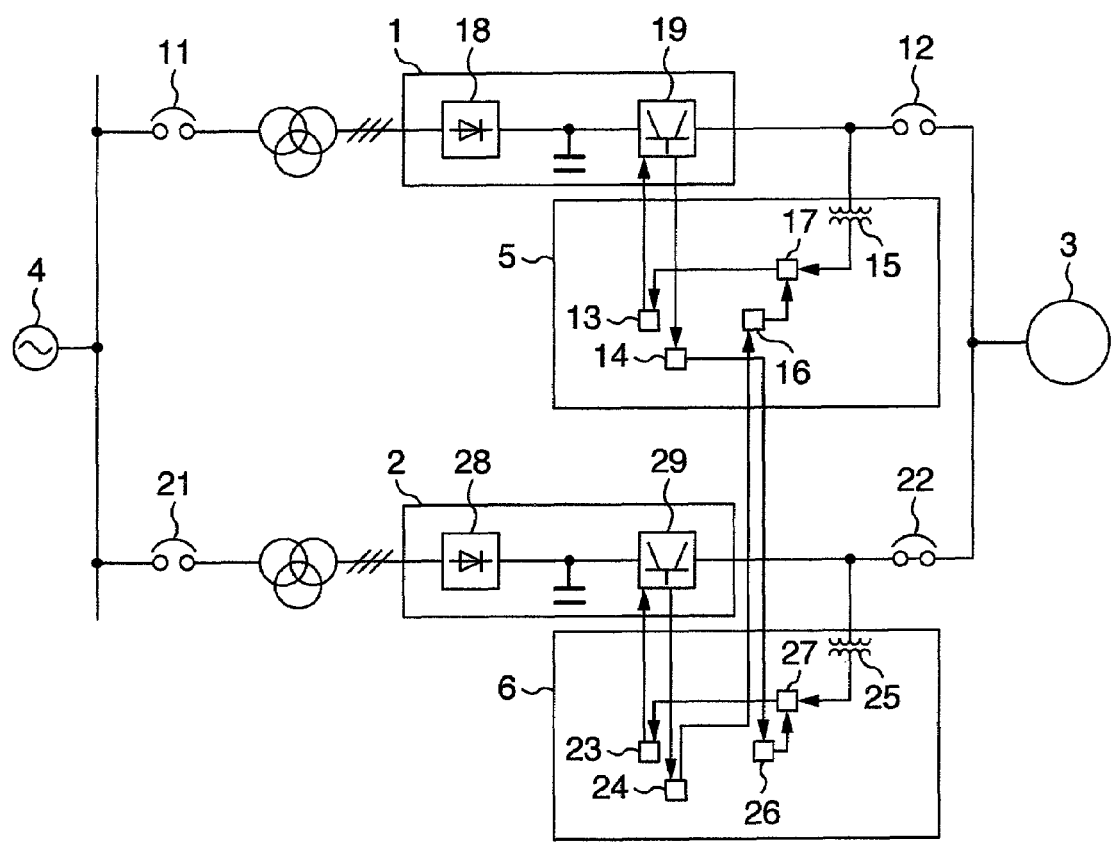
FIG. 3 is a configuration diagram for illustrating a reference example of the induction-motor driving apparatus.

FIG. 3 illustrates a configuration embodiment of the induction-motor driving apparatus configured with two units of inverter control apparatuses with respect to one unit of induction motor 3. Hereinafter, referring to FIG. 3, the explanation will be given below concerning the configuration and operation of the induction-motor driving apparatus.

A first inverter apparatus 1 and a second inverter apparatus 2 for changing an input frequency into the induction motor 3 are connected in parallel to each other. The first inverter apparatus 1 and a power-supply 4 are connected to each other via an input-side breaker 11. Also, the second inverter apparatus 2 and the power-supply 4 are connected to each other via an input-side breaker 21. The second inverter apparatus 2 and the induction motor 3 are connected to each other via an output-side breaker 22. The first and second inverter apparatuses, which are of the same configuration, include rectifiers 18 and 28 and inverters 19 and 29. Also, there are provided a first inverter control circuit 5 for controlling the first inverter apparatus 1 and a second inverter control circuit 6 for controlling the second inverter apparatus 2, thereby controlling outputs of the inverters. Each of the inverter control apparatuses includes the inverter apparatus and the inverter control circuit.

During the normal operation, of the two units of inverter control apparatuses, one unit is used as an operation-oriented-system inverter control apparatus. Accordingly, the input-side breaker and the output-side breaker are closed, then controlling the induction motor 3 using the corresponding inverter apparatus. The other inverter control apparatus is used as a standby-oriented-system inverter control apparatus. At the time of a failure occurrence of the operation-oriented-system inverter control apparatus, the operation switching is performed by switching each of the breakers to the standby-oriented-system inverter control apparatus.

Next, the explanation will be given below regarding configuration of the first inverter control circuit 5 for controlling the first inverter apparatus 1. An inverter start frequency/phase setting circuit 13 for setting frequency and phase at an inverter-apparatus starting time, and a failure detection circuit 14 for detecting a failure of the first inverter apparatus 1, and notifying side of the second inverter apparatus 2 about the failure are configured such that the circuit 13 and the circuit 14 are connected to the inverter 19. Also, an induction-motor rotation frequency/phase detection circuit 15 for detecting rotation frequency and phase of the induction motor 3 is connected to between the first inverter apparatus 1 and an output-side breaker 12. The detection values detected by the induction-motor rotation frequency/phase detection circuit 15 are inputted into a failure-time input frequency/phase setting circuit 17. The failure-time input frequency/phase setting circuit 17 performs a computation processing based on the detection values inputted from the induction-motor rotation frequency/phase detection circuit 15, then outputting the computed output to the inverter start frequency/phase setting circuit 13. Also, a failure-occurrence-signal reception circuit 16 for receiving a failure occurrence signal outputted from the side of the second inverter apparatus 2 is configured to be connected to the failure-time input frequency/phase setting circuit 17, so that the failure-occurrence-signal reception circuit 16 activates the failure-time input frequency/phase setting circuit 17 when the circuit 16 has received the failure occurrence signal of the second inverter apparatus 2.

Next, the explanation will be given below regarding configuration of the second inverter control circuit 6 for controlling the second inverter apparatus 2. The configuration of the second inverter control circuit 6 is basically the same as that of the first inverter control circuit 5. Namely, an inverter start frequency/phase setting circuit 23 for setting frequency and phase at an inverter-apparatus starting time, and a failure detection circuit 24 for detecting a failure of the second inverter apparatus 2, and notifying side of the first inverter apparatus 1 about the failure are configured such that the circuit 23 and the circuit 24 are connected to the inverter 29. Also, an induction-motor rotation frequency/phase detection circuit 25 for detecting the rotation frequency and phase of the induction motor 3 is connected to between the second inverter apparatus 2 and an output-side breaker 22. The detection values detected by the induction-motor rotation frequency/phase detection circuit 25 are inputted into a failure-time input frequency/phase setting circuit 27. The failure-time input frequency/phase setting circuit 27 performs a computation processing based on the detection values inputted from the induction-motor rotation frequency/phase detection circuit 25, then outputting the computed output to the inverter start frequency/phase setting circuit 23. Also, a failure-occurrence-signal reception circuit 26 for receiving a failure occurrence signal outputted from the side of the first inverter apparatus 1 is configured to be connected to the failure-time input frequency/phase setting circuit 27 so that the circuit 26 activates the failure-time input frequency/phase setting circuit 27 when the circuit 26 receives the failure occurrence signal of the first inverter apparatus 1.

Figure 4:
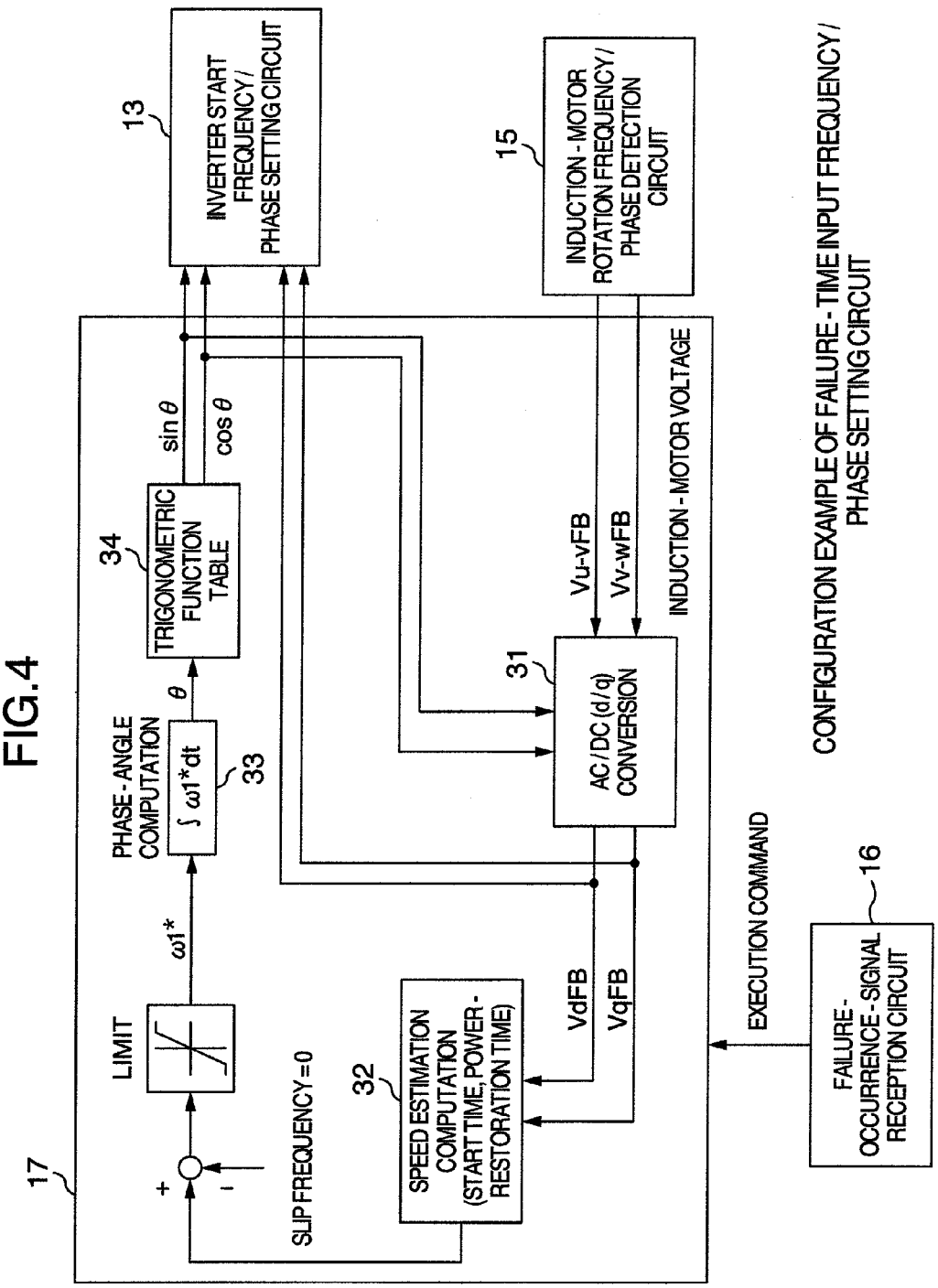
FIG. 4 is an explanatory diagram for illustrating a configuration example of a failure-time input frequency/phase setting circuit.

FIG. 4 illustrates a configuration embodiment of the failure-time input frequency/phase setting circuit 17 or 27. Referring to FIG. 4, the explanation will be given below concerning outline of the computation processing by the failure-time input frequency/phase setting circuit 17 or 27.

The induction-motor voltage of the induction motor 3 detected by the induction-motor rotation frequency/phase detection circuit 15 is inputted into the circuit 17 or 27. Then, the AC induction-motor voltage inputted is converted into a DC voltage by using an AC/DC converter (d/q conversion) 31, and is converted onto d/q axes simultaneously. Next, the induction-motor voltage converted is inputted into a speed estimation computator 32, thereby generating a phase-angle command $\omega 1^*$. Moreover, a slip frequency is added to the generated phase-angle command $\omega 1^*$, then calculating a phase $\theta$ by integrating the phase angle by using a phase-angle computator 33. Furthermore, based on the phase $\theta$ calculated, values of sinusoidal wave $\sin g$ and cosine wave $\cos \theta$ are acquired by making reference to a trigonometric function table 34. This data is feed-backed to the AC/DC converter (d/q conversion) 31.

Based on this feed-back process, the value of the phase-angle command $\omega 1^*$ is changed so that the d-axis voltage VdFB becomes equal to zero. This changing operation makes it possible to cause the rotation frequency and phase of the phase-angle command value of the inverter to coincide with the rotation frequency and phase of the induction motor 3. At the time of activating the inverter, the inverter is activated at a point-in-time when the frequency and phase of the inverter and those of the induction motor 3 coincide with each other. Then, driving the induction motor is started.

For example, assume a case where the operation-oriented-system inverter apparatus is the second inverter apparatus 2, and the standby-oriented-system inverter apparatus is the first inverter apparatus 1. In this case, if a failure occurs in the operation-oriented-system second inverter apparatus 2, the input-side breaker 21 and the output-side breaker 22 on the side of the second inverter apparatus 2 are opened, and the input-side breaker 11 and the output-side breaker 12 on the side of the first inverter apparatus 1 are closed. As a result, the connection relationship between the inverter apparatuses is switched. In accompaniment therewith, if the failure-occurrence-signal reception circuit 16 of the standby-oriented-system first inverter apparatus 1 has received the failure occurrence signal outputted from the failure detection circuit 24 of the operation-oriented-system second inverter apparatus 2, the circuit 16 activates the failure-time input frequency/phase setting circuit 17. Then, the circuit 17 inputs the rotation frequency/phase of the induction motor detected by the induction-motor rotation frequency/phase detection circuit 15, thereby starting the computation processing. Conventionally, when the failure-time input frequency/phase setting circuit 17 is activated, 100-% value of the phase angle has been set as the initial value of the phase-angle command $\omega 1^*$. Moreover, the value of the phase-angle command $\omega 1^*$ is modified so that the d-axis voltage VdFB becomes equal to zero. Here, the d-axis voltage VdFB is computed based on this 100-% value and residual voltage of the induction motor 3. Then, at the point-in-time when the rotation frequency and phase of the phase-angle command value coincide with the rotation frequency and phase of the induction motor 3, the computed output of the failure-time input frequency/phase setting circuit 17 is inputted into the inverter start frequency/phase setting circuit 13. This input has allowed the standby-oriented-system first inverter apparatus 1 to be activated, thereby starting the control over the induction motor 3.

Figure 5:
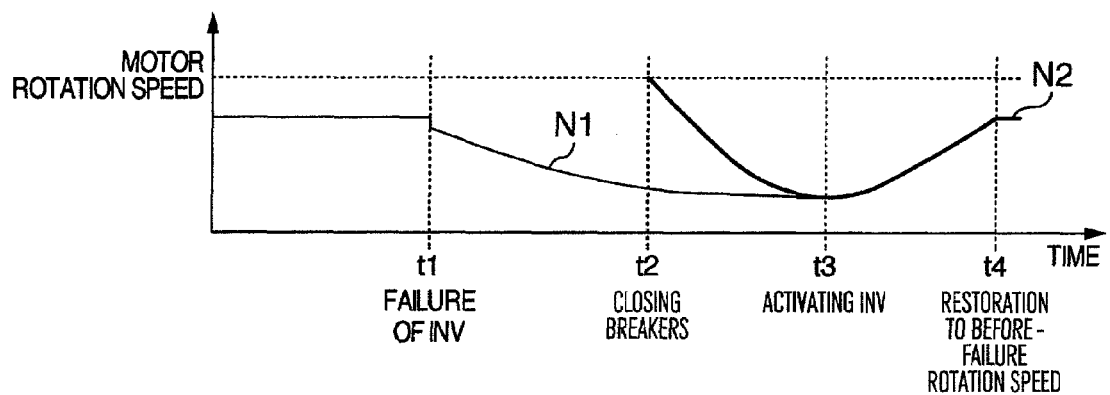
FIG. 5 is an explanatory diagram for illustrating an example of a change in the rotation speed of the induction motor at the time of switching the inverter apparatus according to a reference example.

FIG. 5 illustrates an example of a change in the rotation speed of the induction motor at the switching operation time of the inverter apparatus at a failure occurrence time of the inverter apparatus according to the reference embodiment (i.e., FIG. 3). Here, the graph N1 represents the motor rotation speed of the induction motor 3, and the graph N2 represents the phase-angle command $\omega 1^*$ computed by the failure-time input frequency/phase setting circuit 17. Incidentally, here, the explanation will be given employing the example where the first inverter apparatus 1 is switched from the standby-oriented system to the operation-oriented system. The explanation, however, is basically the same in a case as well where the second inverter apparatus 2 is switched.

If, at a point-in-time t1, a failure occurs in the operation-oriented-system second inverter apparatus 2, the rotation speed N1 of the induction motor 3 is getting lowered gradually. Then, at a point-in-time t2, the operation switching of the inverter apparatuses is performed by closing the input-side breaker 11 and the output-side breaker 12 on the side of the standby-oriented-system first inverter apparatus 1. Simultaneously therewith, the failure-time input frequency/phase setting circuit 17 is activated. The failure-time input frequency/ phase setting circuit 17 inputs the induction-motor voltage detected by the induction-motor rotation frequency/phase detection circuit 15, thereby computing the phase-angle command ω1*. The 100-% output is always set as the initial value of the phase-angle command ω1* N2 regardless of the induction-motor rotation frequency/phase immediately before the failure. The coincidence operation is performed so that the rotation frequency and phase of the phase-angle command ω1* coincide with the rotation frequency and phase of the induction motor 3. Then, at a point-in-time t3, both of the rotation frequencies and phases coincide with each other (i.e., line of the graph N1 and that of the graph N2 coincide with each other). Moreover, at the point-in-time t3 when both of the rotation frequencies and phases coincide with each other, the computed output of the failure-time input frequency/phase setting circuit 17 is inputted into the inverter start frequency/phase setting circuit 13, thereby activating the inverter. After the inverter has been activated, driving the induction motor 3 by using the first inverter apparatus 1 is started. Furthermore, at a point-in-time t4, the rotation speed of the induction motor 3 is restored back to the rotation speed before the failure by being accelerated.

In this way, at a failure occurrence time of the inverter apparatus, the following two times become necessary: the breaker switching time (i.e., from t1 to t2) for switching the operation-oriented-system/standby-oriented-system inverter apparatuses, and the time (i.e., from t2 to t3) for causing the rotation frequency/phase of the induction motor and the rotation frequency/phase of the phase-angle command ω1* of the inverter to coincide with each other. As a consequence, a time was necessitated until the rotation speed has been restored back to the before-failure rotation speed.

Figure 6:
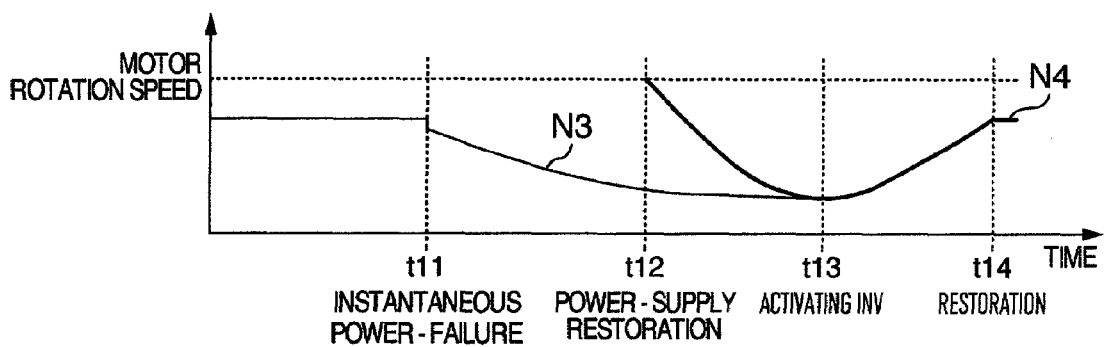
FIG. 6 is an explanatory diagram for illustrating an example of a change in the rotation speed of the induction motor at the time of an instantaneous power-failure of the power-supply.

FIG. 6 illustrates an example of a change in the rotation speed of the induction motor at the time of restarting the inverter apparatus at the time of an instantaneous power-failure or voltage lowering of the power-supply. As is the case with FIG. 5, the graph N3 represents the motor rotation speed of the induction motor 3, and the graph N4 represents the phase-angle command ω1* computed by the failure-time input frequency/phase setting circuit 17. Incidentally, here, the explanation will be given employing an example where the instantaneous power-failure occurs during the operation of the first inverter apparatus 1, and where the first inverter apparatus 1 is restarted after restoration of the power-supply. The explanation, however, is basically the same in a case as well where the second inverter apparatus 2 is restarted.

If, at a point-in-time t11, an instantaneous power-failure of the power-supply occurs, the control by the first inverter apparatus 1 halts. As a result, the rotation speed of the induction motor 3 is getting lowered gradually. If, at a point-in-time t12, the power-supply is restored, the failure-time input frequency/phase setting circuit 17 is activated. Then, the failure-time input frequency/phase setting circuit 17 inputs the induction-motor voltage detected by the induction-motor rotation frequency/phase detection circuit 15, thereby computing the phase-angle command ω1*. Hereinafter, as is the case with FIG. 5, the 100-% output is set as the initial value of the phase-angle command ω1*, and the coincidence operation is performed so that the rotation frequency and phase of the phase-angle command ω1* coincide with the rotation frequency and phase of the induction motor 3. Then, at a point-in-time t13, both of the rotation frequencies and phases coincide with each other. Moreover, the inverter is activated at the point-in-time t13, and driving the induction motor 3 by using the first inverter apparatus 1 is started. Furthermore, at a point-in-time t14, the rotation speed of the induction motor 3 is restored back to the rotation speed before the power-failure by being accelerated.

In this way, at the time of an instantaneous power-failure or voltage lowering of the power-supply as well, after the power-supply has been restored, the time becomes necessary which is needed for causing the rotation frequency/phase of the induction motor and the rotation frequency/phase of the phase-angle command ω1* of the inverter to coincide with each other. As a consequence, a time was necessitated until the rotation speed has been restored back to the before-power-failure rotation speed.

Figure 1:
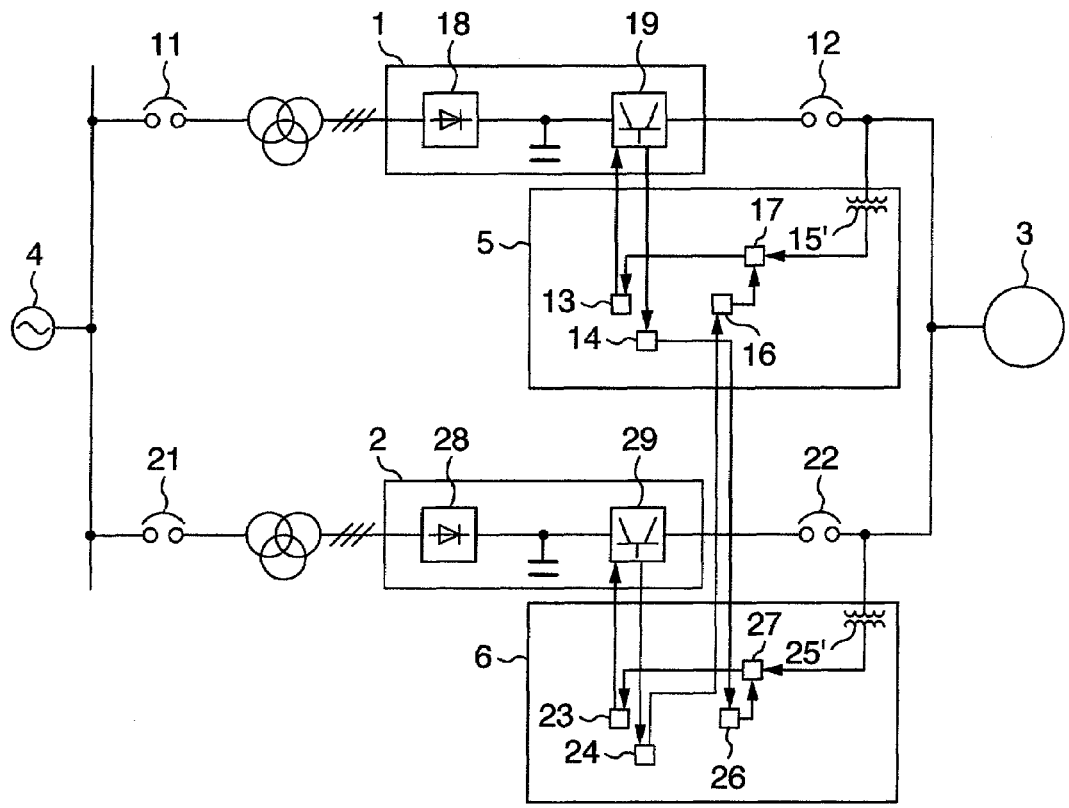
FIG. 1 is a configuration diagram for illustrating a configuration embodiment of an induction-motor driving apparatus according to an embodiment of the present invention.

FIG. 1 is a configuration diagram for illustrating a configuration embodiment of the induction-motor driving apparatus according to an embodiment of the present invention. Incidentally, the same reference numerals will be allocated to the same configuration components as the ones in the configuration diagram of the induction-motor driving apparatus illustrated in FIG. 3, and thus the detailed explanation thereof will be omitted. Additionally, in FIG. 1, the embodiment is given where two units of inverter control apparatuses configuring the induction-motor driving apparatus are connected in parallel. It is possible, however, to configure the induction-motor driving apparatus with the use of the inverter control apparatuses which are larger than two in number.

The induction-motor driving apparatus according to the present embodiment is configured by connecting in parallel the two units of inverter control apparatuses for driving one unit of induction motor 3. The first inverter control apparatus includes the first inverter apparatus 1 including the rectifier 18 and the inverter 19, and the first inverter control circuit 5 for controlling the first inverter apparatus 1. Similarly, the second inverter control apparatus includes the second inverter apparatus 2 including the rectifier 28 and the inverter 29, and the second inverter control circuit 6 for controlling the second inverter apparatus 2.

Next, the explanation will be given below concerning configuration of the first and second inverter control circuits 5 and 6 for controlling the first and second inverter apparatuses 1 and 2 respectively. The inverter control circuits 5 and 6 of the two units of inverter control apparatuses are of the same configuration. Accordingly, the explanation will be given selecting the first inverter control circuit 5 as the example. The inverter start frequency/phase setting circuit 13 for setting the frequency and phase at the inverter-apparatus starting time, and the failure detection circuit 14 for detecting a failure of the first inverter apparatus 1, and notifying side of the second inverter apparatus 2 about the failure are configured such that the circuit 13 and the circuit 14 are connected to the inverter 19. Also, an induction-motor rotation frequency/phase detection circuit 15' for detecting the rotation frequency and phase of the induction motor 3 is connected to between the output-side breaker 12 of the first inverter apparatus 1 and the induction motor 3. The detection values detected by the induction-motor rotation frequency/phase detection circuit 15' are inputted into the failure-time input frequency/phase setting circuit 17. The failure-time input frequency/phase setting circuit 17 performs the computation processing based on the detection values inputted from the induction-motor rotation frequency/phase detection circuit 15', then outputting the computed output to the inverter start frequency/phase setting circuit 13. Also, the failure-occurrence-signal reception circuit 16 for receiving a failure occurrence signal outputted from the side of the second inverter apparatus 2 is configured to be connected to the failure-time input frequency/phase setting circuit 17, so that the inverter start frequency/phase setting circuit 16 instructs the failure-time input frequency/ phase setting circuit 17 to output the computed output of the circuit 17 to the inverter start frequency/phase setting circuit 13 when the circuit 16 has received the failure occurrence signal of the second inverter apparatus 2.

Incidentally, as is the case with the failure-time input frequency/phase setting circuit 17 or 27 in the system illustrated in FIG. 3, the failure-time input frequency/phase setting circuit 17 or 27 of the inverter control circuit 5 or 6 according to the present embodiment is set to be of the configuration illustrated in FIG. 4. Also, the computation processing by the failure-time input frequency/phase setting circuit 17 or 27 according to the present embodiment is basically the same as the processing example in FIG. 3 explained earlier.

The point which differs between the induction-motor driving apparatus according to the present embodiment and the induction-motor driving apparatus illustrated in FIG. 3 is the connection position of the induction-motor rotation frequency/phase detection circuit 15' or 25'. Namely, the induction-motor rotation frequency/phase detection circuit 15' is configured to be connected to between the output-side breaker 12 of the first inverter apparatus 1 and the induction motor 3, and the induction-motor rotation frequency/phase detection circuit 25' is configured to be connected to between the output-side breaker 22 of the second inverter apparatus 2 and the induction motor 3.

In the configuration illustrated in FIG. 3, the induction-motor rotation frequency/phase detection circuit 15 or 25 is connected to between the inverter apparatus 1 or 2 and the output-side breaker 12 or 22. As a result, when the output-side breaker 12 or 22 is opened and thus the inverter apparatus 1 or 2 and the induction motor 3 are not connected with each other, the induction-motor rotation frequency/phase detection circuit 15 or 25 has found it impossible to detect the rotation frequency/phase of the induction motor 3. On account of this drawback, at the time of switching the operation in accompaniment with a failure of the inverter apparatus 1 or 2, the detection circuit 15 or 25 has started the detection of the rotation frequency/phase of the induction motor 3 after the output-side breaker 12 or 22 has been closed and thus the inverter apparatus 1 or 2 and the induction motor 3 have fallen into the connection state.

In contrast thereto, in the present embodiment, even if the output-side breaker 12 or 22 is opened and thus the inverter apparatus 1 or 2 and the induction motor 3 are not connected with each other, the induction-motor rotation frequency/phase detection circuit 15' or 25' finds it possible to detect the rotation frequency/phase of the induction motor 3. Accordingly, the computation processing of the input frequency/phase by the failure-time input frequency/phase setting circuit 17 or 27 can be carried out at all times. On account of this feature, even if the inverter apparatus 1 or 2 is in the standby state, the rotation frequency/phase of the phase-angle command $\omega 1^*$ computed by the failure-time input frequency/phase setting circuit 17 or 27 can be caused to always coincide with the rotation frequency/phase of the induction motor 3.

Figure 2:
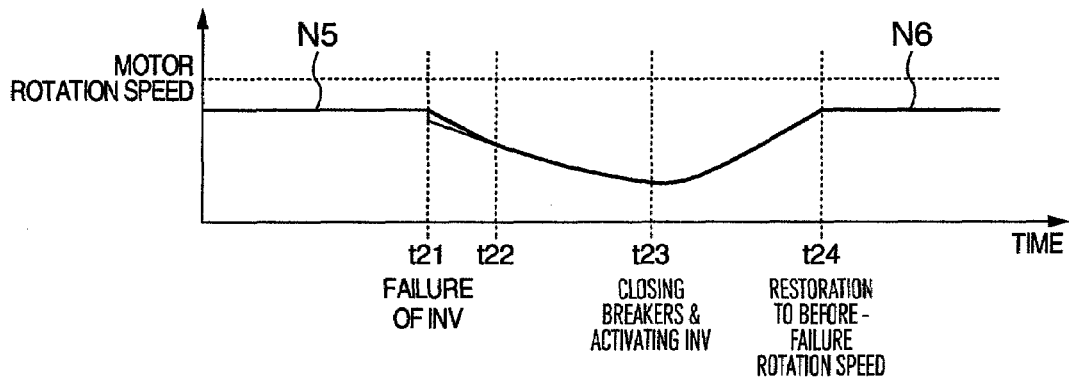
FIG. 2 is an explanatory diagram for illustrating an example of a change in rotation speed of the induction motor at the time of switching an inverter apparatus according to the embodiment of the present invention.

FIG. 2 illustrates an example of a change in the rotation speed of the induction motor at the switching operation time of the inverter apparatus at a failure occurrence time of the inverter apparatus according to the present embodiment. Here, the graph N5 represents the motor rotation speed of the induction motor 3, and the graph N6 represents the phase-angle command $\omega 1^*$ computed by the failure-time input frequency/phase setting circuit 17. Incidentally, here, the explanation will be given employing the example where the first inverter apparatus 1 is switched from the standby-oriented system to the operation-oriented system. The explanation, however, is basically the same in a case as well where the second inverter apparatus 2 is switched.

In FIG. 2, if, at a point-in-time t21, a failure occurs in the operation-oriented-system second inverter apparatus 2, the rotation speed of the induction motor 3 is getting lowered gradually. Meanwhile, the induction-motor rotation frequency/phase detection circuit 15' of the first inverter apparatus 1 can detect the rotation frequency/phase of the induction motor 3 even if the output-side breaker 12 is opened. Consequently, the failure-time input frequency/phase setting circuit 17 had executed the computation processing before the occurrence of the failure. On account of this feature, the rotation frequency/phase of the phase-angle command $\omega 1^*$ computed by the failure-time input frequency/phase setting circuit 17 can be caused to coincide in a short time with the rotation frequency/phase of the induction motor 3 which has been lowered due to the failure occurrence. Then, at a point-in-time t22, both of the rotation frequencies/phases coincide with each other. On account of this, at a point-in-time t23, the inverter can be activated by closing the output-side breaker 12 on the side of the standby-oriented-system first inverter apparatus 1, and by inputting the computed output of the failure-time input frequency/phase setting circuit 17 into the inverter start frequency/phase setting circuit 13. After the inverter has been activated, driving the induction motor 3 by using the first inverter apparatus 1 is started. Furthermore, at a point-in-time t24, the rotation speed of the induction motor 3 is restored back to the rotation speed before the failure by being accelerated.

In this way, in the present embodiment, the computation processing for causing the rotation frequency/phase of the induction motor and the rotation frequency/phase of the phase-angle command $\omega 1^*$ of the inverter to coincide with each other can be executed before the breaker switching for switching the operation-oriented-system/standby-oriented-system inverter apparatuses. This feature makes it possible to shorten the time needed for restoring the rotation speed of the induction motor 3 back to the before-failure rotation speed.

Also, in the failure-time input frequency/phase setting circuit of the system illustrated in FIG. 3, as the initial value of the phase-angle command $\omega^*$ to be set in the computation processing, the 100-% output is always set regardless of the induction-motor rotation frequency/phase immediately before the failure. From this state where the 100-% output is set, the computation processing for causing the rotation frequency/phase of the induction motor 3 and the rotation frequency/phase of the phase-angle command $\omega 1^*$ of the inverter to coincide with each other has been executed. On account of this situation, a time was necessitated in the computation processing until the rotation frequencies and phases of the induction motor 3 and the phase-angle command $\omega 1^*$ have coincided with each other. On the other hand, in the present embodiment, since the induction-motor rotation frequency/phase detection circuit 15' or 25' monitors the rotation frequency/phase of the induction motor 3 at all times, the circuit 15' or 25' can detect the induction-motor rotation frequency/phase immediately before the failure. From this feature, the initial value for the computation processing can be set based on the induction-motor output immediately before the failure, and thus the coincidence operation of the rotation frequencies and phases can be performed from this initial value. This makes it possible to shorten the computation time for computing the inverter-apparatus start frequency/phase.

Also, the power-supply of each inverter control circuit is set as a power-supply whose power-supply line is different from the power-supply line of each inverter apparatus for supplying the power to induction motor. This configuration makes it possible to continue the computation processing by each failure-time input frequency/phase setting circuit even at the halting time of the inverter apparatus in accompaniment with an instantaneous power-failure or voltage lowering of the power-supply. On account of this, based on the induction-motor output immediately before the occurrence of the instantaneous power-failure or voltage lowering of the power-supply, the computation processing for causing the rotation frequency/phase of the induction motor 3 and the rotation frequency/phase of the phase-angle command $\omega 1^*$ of the inverter to coincide with each other can be executed during the power-failure as well. This feature makes it possible to shorten the computation time as well for computing the inverter-apparatus start frequency/phase at the time of reactivating the inverter apparatus after restoration of the power-supply.

Incidentally, in the present embodiment, the induction-motor rotation frequency/phase detection circuits 15' and 25' are configured such that each of the circuits 15' and 25' is set up in each of the two units of inverter control apparatuses. The detection circuits 15' and 25', however, can also be configured by using one unit of induction-motor rotation frequency/phase detection circuit. In this case, an output from the one unit of induction-motor rotation frequency/phase detection circuit is configured such that the output is inputted into each failure-time input frequency/phase setting circuit of the two units of inverter control apparatuses. In the foregoing explanation of the embodiments, the explanation has been given selecting, as the example, the case where the induction motor is driven. The motor driving system and method according to the present invention, however, is also applicable to motors of the other types. Also, although each configuration component has been explained as each circuit, each (entire or partial) circuit is replaced by software when each component is implemented using a computer.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A motor driving apparatus, comprising:
  inverter apparatuses each of which including a rectifier and an inverter;
  inverter control units for controlling said inverter apparatuses;
  a unit formed by connecting a plurality of inverter control apparatuses in parallel to each other, said plurality of inverter control apparatuses performing variable-speed driving of a motor; and
  breakers each of which being provided between each of said inverter apparatuses and said motor;
  each of said inverter control units, further comprising:
  a failure detection unit for detecting a failure of each of said inverter apparatuses;
  an inverter start frequency/phase setting unit for setting frequency/phase at an inverter-apparatus starting time;
  a motor rotation frequency/phase detection unit for detecting frequency and phase of a terminal voltage at said motor;
  a failure-time input frequency/phase setting unit for performing a computation based on said values detected by said motor rotation frequency/phase detection unit, and outputting said computed output to said inverter start frequency/phase setting unit; and
  a failure-occurrence-signal reception unit for receiving a failure occurrence signal outputted from a failure detection unit of the other inverter control apparatus, inputting said output of said failure-time input frequency/phase setting unit into said inverter start frequency/phase setting unit, and instructing said inverter start frequency/phase setting unit to start said inverter; wherein,
  at a failure occurrence time of each of said inverter apparatuses for driving said motor,
  each of said breakers is switched to said other inverter control apparatus based on a failure occurrence signal outputted from said failure detection unit of said inverter control apparatus, and
  said inverter is started by controlling said frequency and said phase at said inverter-apparatus starting time by using said failure-time input frequency/phase setting unit of said inverter control apparatus which is to be newly started by said switching.

2. The motor driving apparatus according to claim 1, wherein
  said motor rotation frequency/phase detection unit of each of said inverter control units is set up on a closer side to said motor than said breakers each of which being provided between each of said inverter apparatuses and said motor,
  said frequency and said phase of said terminal voltage at said motor detected by said motor rotation frequency/phase detection unit being inputted into said failure-time input frequency/phase setting unit regardless of close/open of each of said breakers, and said computation by said failure-time input frequency/phase setting unit being carried out at all times.

3. The motor driving apparatus according to claim 1, wherein
  a power-supply of said inverter control units is set as a power-supply whose power-supply line is different from power-supply line of said inverter apparatuses, and,
  even if an instantaneous power-failure or voltage lowering occurs in said power-supply to which said inverter apparatuses are connected, and said power-feed from said inverter apparatuses to said motor is broken off,
  said frequency and said phase of said terminal voltage at said motor detected by said motor rotation frequency/phase detection unit of each of said inverter control units is inputted into said failure-time input frequency/phase setting unit, and said computation by said failure-time input frequency/phase setting unit is carried out continuously.

4. A motor driving method, comprising the steps of:
  detecting a failure of each of inverter apparatuses by using a failure detection unit of an inverter control apparatus;
  setting frequency/phase at an inverter-apparatus starting time by using an inverter start frequency/phase setting unit of said inverter control apparatus;
  detecting frequency and phase of a terminal voltage at a motor by using a motor rotation frequency/phase detection unit of said inverter control apparatus;
  performing, by using a failure-time input frequency/phase setting unit of said inverter control apparatus, a computation based on said values detected by said motor rotation frequency/phase detection unit, and outputting said computed output to said inverter start frequency/phase setting unit; and
  receiving, by using a failure-occurrence-signal reception unit of said inverter control apparatus, a failure occurrence signal outputted from a failure detection unit of the other inverter control apparatus, inputting said output of said failure-time input frequency/phase setting unit into said inverter start frequency/phase setting unit, and instructing said inverter start frequency/phase setting unit to start said inverter; wherein, at a failure occurrence time of each of said inverter apparatuses for driving said motor, said motor driving method further comprises the steps of:

switching each of breakers to said other inverter control apparatus based on a failure occurrence signal outputted from said failure detection unit of said inverter control apparatus; and starting said inverter by controlling said frequency and said phase at said inverter-apparatus starting time by using said failure-time input frequency/phase setting unit of said inverter control apparatus which is to be newly started by said switching.

* * * * *